April 6, 1954
C. G. PULLIN ET AL
2,674,327
ROTOR BLADE FOR HELICOPTERS AND THE
LIKE ROTARY-WINGED AIRCRAFT
Filed March 23, 1948
4 Sheets-Sheet 1
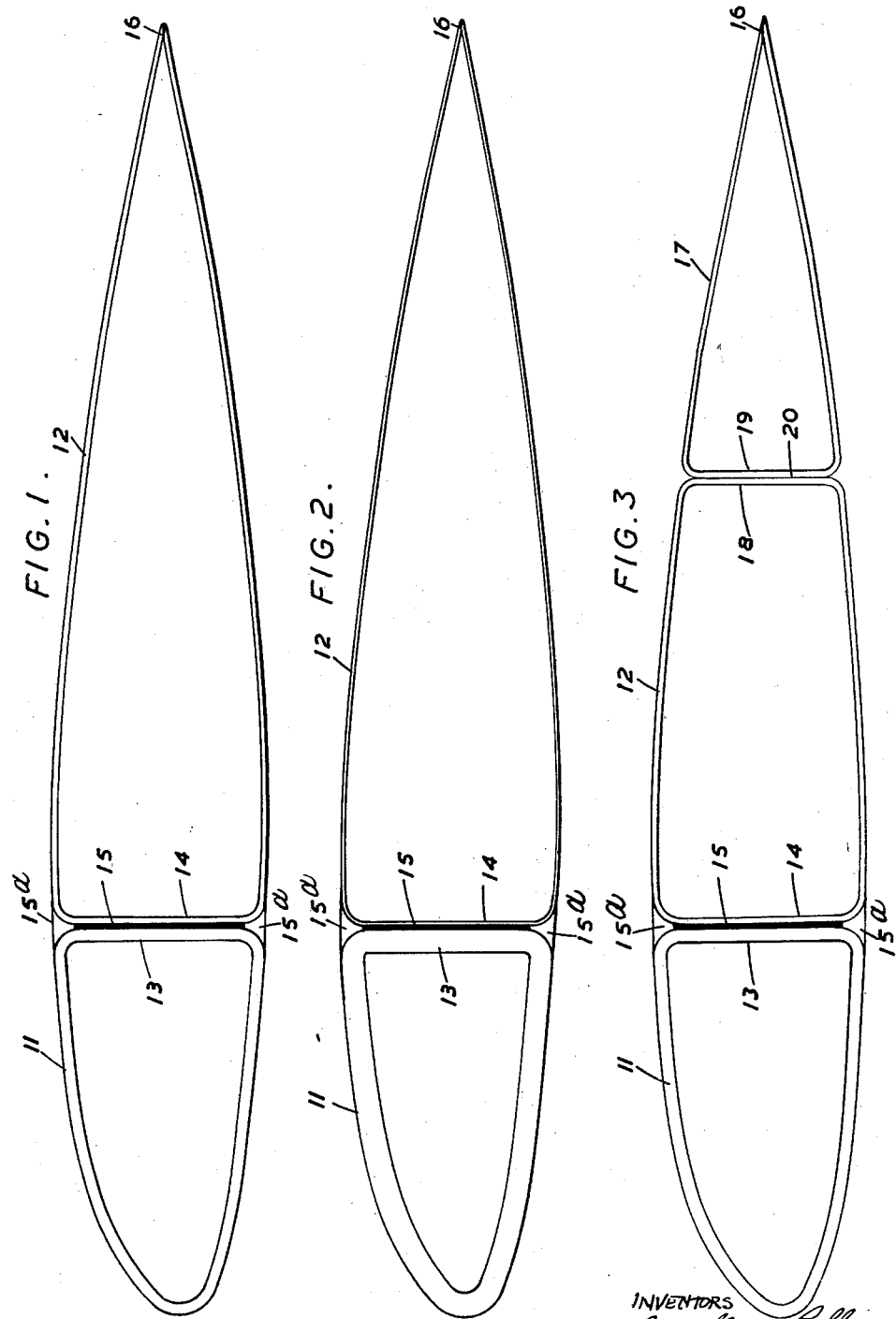

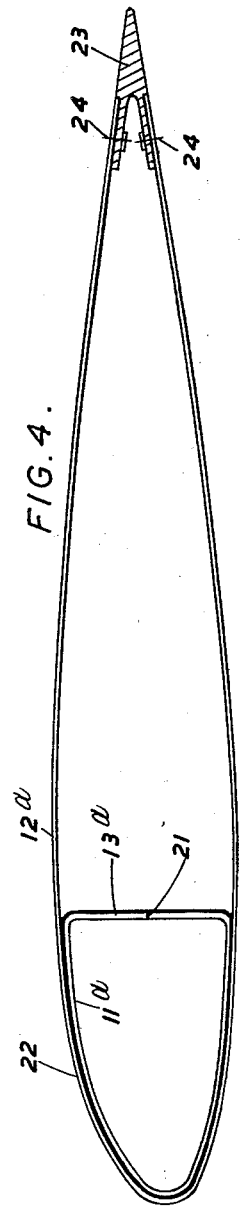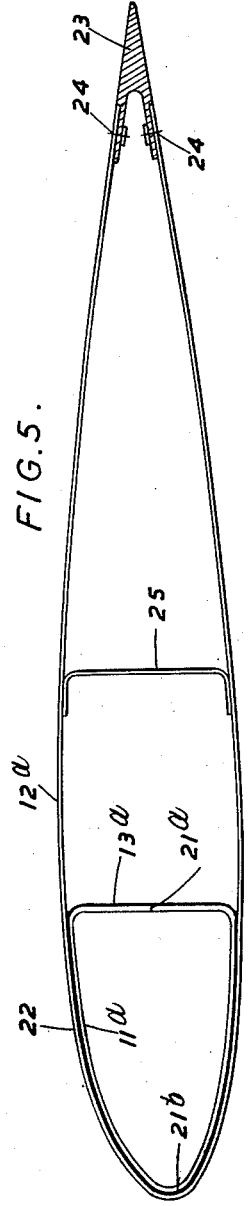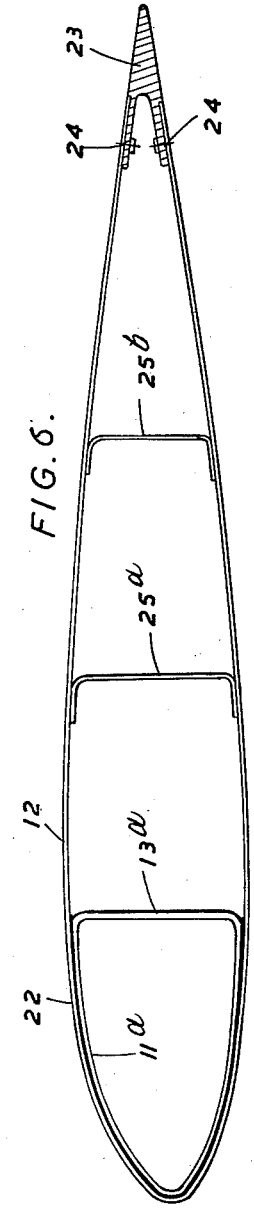

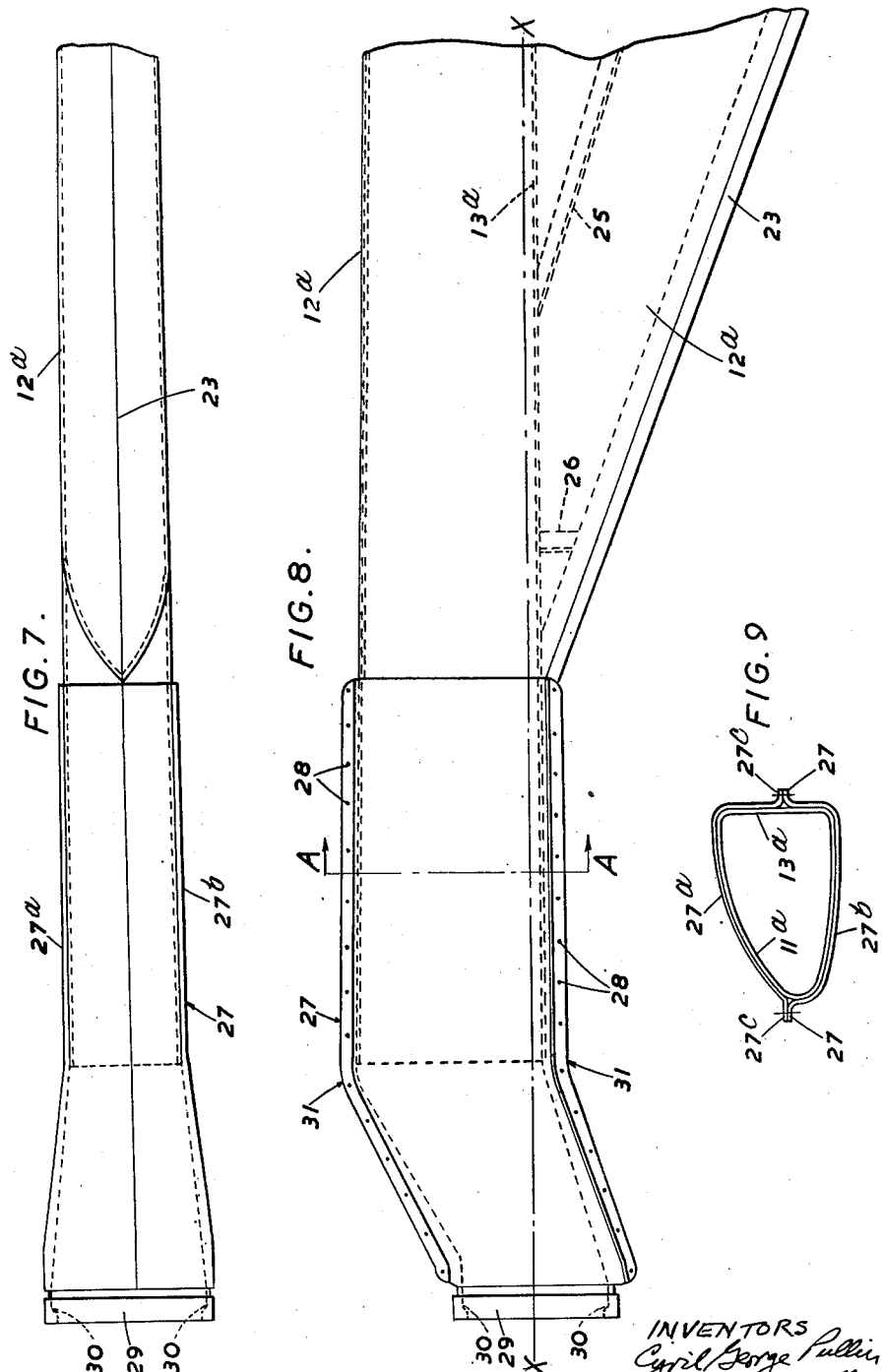

April 6, 1954     C. G. PULLIN ET AL     2,674,327
ROTOR BLADE FOR HELICOPTERS AND THE
LIKE ROTARY-WINGED AIRCRAFT
Filed March 23, 1948     4 Sheets—Sheet 4
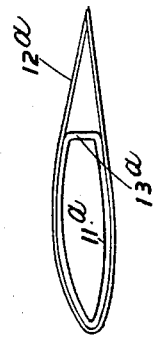
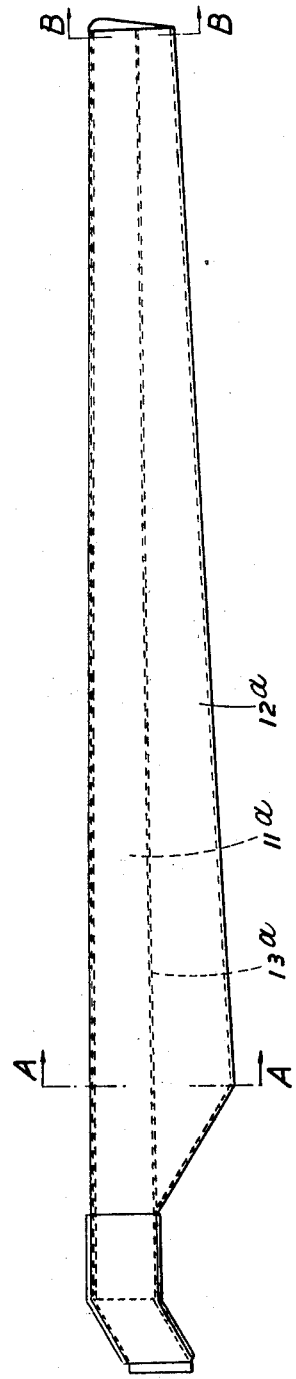
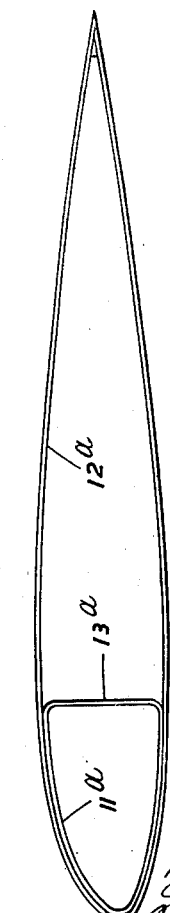
INVENTORS
Cyril George Pullin
Jacob Samuel Shapiro
BY Sylvester & LeClare
ATTORNEYS Patented Apr. 6, 1954

2,674,327

UNITED STATES PATENT OFFICE 2,674,327

ROTOR BLADE FOR HELICOPTERS AND THE LIKE ROTARY-WINGED AIRCRAFT

Cyril George Pullin, Tadburn, Ampfield, and Jacob Samuel Shapiro, Hampstead, London, England, assignors, by mesne assignments, to Autogiro Company of America, Philadelphia, Pa., a corporation of Delaware Application March 23, 1948, Serial No. 16,594

Claims priority, application Great Britain December 3, 1947

11 Claims. (Cl. 170—159)

This invention relates to rotor blades for helicopters and the like rotary-winged aircraft, e. g. rotoplanes, whose rotor blades extend radially from a substantially vertical axis, and more particularly to improved methods of constructing stressed-skin metal rotor blades, especially those whose plan form or/and thickness are tapered or/and which are twisted along all or part of their length, i. e. are "washed-in" or "washed-out."

According to this invention, a rotor blade, which may be tapered in plan form and in thickness, comprises two principal constructional components, viz. a tubular metal main spar of high strength metal with relatively thick walls and whose section is shaped to conform to the leading portion of the aerofoil section, and a light skin of thin sheet metal or of composite construction as hereinafter described, which defines the remainder of the aerofoil section, these two components being bonded to one another over a large contact area by means of a metal-to-metal adhesive or adhesives of a type requiring no pressure for their adhesion and having "gap-filling" properties, i. e. such as to ensure that small voids between the surfaces to be bonded to one another are completely filled with a substance which can be reliably bonded to the metal.

Examples of effective processes for this purpose are those in which the metal surfaces are first treated to obtain a strongly adhering "plastic" layer thereon derived from phenol-formaldehyde and formvar, and between the surfaces thus prepared is disposed a layer of gap-filling material such as a phenol-formaldehyde, urea-formaldehyde or resorcinol derivative which can be caused to adhere strongly to the prepared surfaces; or the process known as the "hot" rubber process can be used.

All these bonding materials are electrolytically inert, and provide a protective layer between metals of different electro-chemical properties, thus preventing electrolytic corrosion at the joint faces.

In the bonding operation heating, if required, is preferably effected by means of steam introduced into the interior of the components, for which their shape is well adapted.

In one preferred form of construction of a rotor blade the two principal components mate with one another along a flat spanwise joint surface perpendicular to the chord line, or approximately so, and together constitute a stressed-skin blade with stiffening web.

In another preferred form of construction, the skin component is wrapped round the front of the main spar component, i. e. the part thereof conforming to the aerofoil section, and is bonded to it over at least the greater part of the area of contact.

In this construction, the part of the wall of the main spar which does not conform to the aerofoil section and is not bonded to the skin forms an interval web connecting the upper and lower surfaces of the aerofoil section and may be either flat or curved.

In either form of construction the trailing part of the skin which is not supported by the main spar may be devoid of support, except for a trailing edge extruded section, or it may have additional support in the form of auxiliary spars or/and chordwise ribs or/and diagonal stiffeners which may be secured to the skin by riveting or may be bonded thereto in the same manner as the skin is bonded to the main spar. Alternatively, it may be filled with "expanded" cellular material or with a honeycomb structure of paper, metal foil or the like which may be lightly bonded to the metal skin by a "plastic" bond of moderate strength.

In either form of construction the main spar component may be of carbon steel, alloy steel, or high-strength non-ferrous alloy.

The tubular main spar may be made from strip metal shaped in dies and closed by means of a seam, e. g. a welded seam, which is preferably located on the internal web portion of the tube; or it may be in two parts with seams along the leading edge and in the web portion. Alternatively, the spar may be formed from seamless tube, and if tapered may be formed to shape by drawing over a tapered mandrel which is subsequently withdrawn. If necessary, the main spar may incorporate some twist which may be put into it during the shape-forming stage or by applying a twisting moment to the completed tube, and using suitable heat treatment.

The main spar may also be built up of two or more tubes fitted one within the other, whose combined gauges equals the gauge of a corresponding single tube spar.

According to a feature of the invention, the wall gauge of the main spar increases from root to tip. If the spar is tapered the wall gauge is therefore greater at the narrower end of the tube than at the wider end. This leads to a favourable spanwise mass distribution of the complete rotor blade from the point of view of reducing stresses in the blade structure in flight.

In this regard, it is known in the art that the coning position of a pivoted rotor-blade is determined by the balance of the average lift moment against the average centrifugal moment about the flapping pivot. However each element of a blade is not necessarily balanced with respect to lift and centrifugal forces. Actually in blades of usual design there is a moment which produces bending of the blade. The shape of the resulting blade curvature during hovering flight is concave in an upward direction because the lift at the outer portion of the blade is not entirely compensated by the centrifugal action, while the lift at the inner portion of the blade may be over compensated. The compensation is not even throughout the blade length, because the lift varies with respect to the square of the velocity or as the square of the radius, while the centrifugal force, on the other hand, varies directly as the weight and directly as the radius.

As an example, let us consider the outer four feet of a typical blade's radius as compared with the next inner four feet. Theoretically, in a given case, the lift on such outer portion of the blade may for example be 1.44 times as great as the lift on such inner portion, assuming that the radius of the outer portion is 1.2 times the radius of the inner portion. If the weight of the outboard portion is the same as the inboard portion the centrifugal force will be only 1.2 times as great for the outer portion as for the inner portion. However, if, by increasing the wall thickness, the weight of the outer portion is increased by 1.2 times the weight of the next inboard portion, the centrifugal force value will increase by the same amount as the lift of said outer portion exceeds that of the said inner portion, so that each portion of the blade may be substantially correctly balanced by the centrifugal force.

A blade built with the proper mass distribution throughout its length may thus assume substantially a straight line in its coned position with no bending moment. This, of course is only true under substantially vertical flight or hovering conditions, since the variables introduced by forward flight produce bending moments. However, the total bending moment will be reduced if the initial bending moment is reduced or eliminated. In this manner the tapered wall and related features as disclosed and claimed herein may be employed to substantially improve the rotor and its operation, and lengthen its life by reducing fatigue—all of which is of great utility.

In addition, the progressive increase of weight toward the tip has the advantage of permitting the storage of greater energy in the rotor which can be used for cushioning the landing in case of a descent without power.

According to the present invention, if the spar is of seamless tube the required gradation of wall thickness can be obtained by drawing over a tapered mandrel without any additional operation. It is further advantageous that the mean distance from the leading edge, expressed as a fraction of the chord, of the web part of the main spar tube, which joins the upper and lower surfaces of the aerofoil section, should increase continuously from the root to the tip in addition to having the wall thickness of the spar tube increase in this direction. This entails that the proportion of the total perimeter of the aerofoil section occupied by the main spar tube increases progressively from root to tip. By such a disposition of wall thickness and web position it is possible to achieve a very close approximation to the optimum spanwise mass distribution while retaining satisfactory chordwise mass distribution throughout the whole length of the blade, the principal difficulty to be overcome in this respect being that of preventing the chordwise position of the centres of gravity of the outboard blade sections from falling too far aft along the chord.

The skin component may be of the thin light-alloy sheet (aluminum alloy or magnesium alloy), and it may be shaped in dies and may be in one piece or in two pieces with a welded seam on the web or leading edge according to whether it is of the "back-to-back" or the "wrapped" type. The trailing edge may be completed by a welded seam or by an extruded section of light alloy, to which the edges of the sheet are joined by welding or riveting or by screws.

Alternatively, the skin component may be of composite construction of the type in which a layer of light, low-strength material, such as soft wood, balsa wood, expanded cellular material, examples of which are "plastic foam" and calcium alginate, is sandwiched between thin sheets of light alloy or other suitable light metal or of veneers. The usual methods of shaping this kind of material to the required section may be employed; and as with the metal construction the skin component may be made in one piece with a single joint at the trailing edge, or in two parts with an additional joint at the leading edge. The trailing edge may be completed as in the sheet metal construction by a light alloy extrusion secured in any convenient way, e. g. by metal-to-metal bonding, adhesive, riveting or screws.

Further, the skin component may consist of two separate box-sections mating along a flat spanwise bonded joint similar to that between the main spar and skin component in the back-to-back type of construction; and this construction may be carried out in any of the specified materials.

According to another feature of the invention, the inboard end of the main spar, which may be made with a straight taper both in plan and thickness, is secured to a root fitting which is cranked so as to offset the centre line of the main spar tube far enough in front of the axis about which the blade rotates for variation of pitch angle to bring the latter axis into coincidence with the line joining the centre of gravity of the blade sections along which the resultant centrifugal force acts.

The root fitting should be made in high strength material and may be formed as a machined forging, stamping or casting internally shaped to fit the outside of the root end of the main spar tube. It is preferably split along the spanwise plane containing the trailing and leading edges of the blade, the two halves being provided with external flanges at the leading and trailing edges which are bolted or screwed together to clamp the root fitting tightly onto the spar. The joint between the root fitting and the main spar carries the whole centrifugal load of the blade and consequently must be made very secure. It is therefore preferred to make this joint with a gap-filling plastic adhesive or to insert a layer of rubber in it providing a very effective frictional engagement between the parts entering into the joint. If the inboard end of the main spar tube were of constant cross-section, the bond between it and the root fitting would carry the whole centrifugal loading in shear, but the external taper of the spar tube and the internal taper of the root fitting provide mechanical keying to resist the centrifugal loading, thus relieving the bond to some extent of this duty. Nevertheless, it is advisable to clamp the split root fitting very tightly onto the spar-end to ensure that the bond between these parts has the maximum efficacy.

It is important that the flexural strength and stiffness in the chord-span plane of the blade as a whole should be maintained right up to the inboard end of the root sleeve, i. e. that there should be no weak section of the root sleeve in this plane inboard of the inner end of the main spar. This implies that the flexural strength and stiffness in the chord-span plane at every section of this unsupported part of the root sleeve must be at least as great as that of the main spar immediately outboard of the root sleeve.

If the bonding operation calls for heating, the highest temperature that can be required is not high enough to distort, or impair the physical properties of, the root sleeve which therefore remains a precision component of high strength after completion of the assembly.

The nature of the invention will be more fully understood from the following description with reference to the accompanying drawings of several forms of construction of rotor blade in accordance with the invention given by way of example only. In the drawings—

Figure 1 is a view in chordwise section of one form of construction of rotor blade;

Figures 2, 3, 4, 5 and 6 are similar views of alternative forms of construction;

Figure 7 is a view in elevation of the root of a rotor blade constructed in accordance with Figure 5;

Figure 8 is a plan view of the same;

Figure 9 is a view in section along the line A—A of Figure 8;

Figure 10 is a plan view of a complete rotor blade, employing a root construction generally similar to that shown in Figure 8 and a main blade construction generally similar to that shown in Figure 4, although a blade having the plan form of Fig. 10 may of course embody the blade structural features of any of the several embodiments illustrated;

Figures 10a, 10b show sections of the rotor blade taken along the lines A—A and B—B respectively of Figure 10.

The blade construction shown in Figure 1 comprises a leading portion or main spar 11, which is of seamless steel tubing, and a trailing portion or skin component 12 of thin light alloy sheet. The main spar tube 11 is shaped to conform to the leading part of the aerofoil section, the perimeter of the tube section being completed by a flat web portion 13 which mates with a corresponding flat portion 14 of the skin component 12 along a flat joint 15 over the whole area of which the two members 11, 12 are bonded together by means of a gap-filling adhesive or adhesives, as previously described. The remainder of the skin component 12 conforms to the trailing part of the aerofoil section, the upper and lower surfaces being joined by a welded seam 16 at the trailing edge. Owing to the radiusing of the corners of the members 11, 12 at the ends of the joint 15, notches 15a in the external contour of the blade are left and these may be filled either with the gap-filling adhesive by which the joint 15 is bonded or with any suitable plastic or like composition, or by small fillets of any suitable material.

The construction shown in Figure 2 is similar to that shown in Figure 1, except that the main spar 11 is in this instance of high-strength and non-ferrous alloy and is, therefore, of considerably greater wall thickness than the steel tube of Figure 1.

The construction shown in Figure 3 is similar to that of Figure 1, with the exception that the skin component forming the trailing part of the blade is in two parts 12, 17 respectively, the rear part of the tubular member 12 constituting a flat web 18 and the forward part of the trailing portion 17 constituting a similar flat web 19 which are bonded together along a flat joint 20 in the same way as is used for the joint 15. The web portion 18, 19 together constitute an auxiliary spar for the trailing portion of the blade.

In the constructions shown in Figures 1, 2 and 3, the main spar is shown as a seamless tube, as also is the skin component 12 of Figure 3, and the trailing skin component in all three figures is shown as having a single seam at the trailing edge, which may be a welded seam. Alternatively, the main spar may be made of seamed tubing shaped from strip with a single seam near the centre of the web portion 13, or in two parts, in which case the second seam would be at the leading edge. Similarly, the skin component 12 may be in two parts (see Figure 1) with a seam near the centre of the web portion 14, and in Figure 3 the component 12 may have a seam at or near the centre of one or other or both of the web portions 14 and 18 and the skin component 17 may have a seam at or near the centre of the web portion 19.

Figure 4 shows one form of the alternative construction in which the skin component is wrapped round the leading portion of the main spar tube. The main spar 11a in this instance is an alloy steel tube conforming to the leading portion of the aerofoil section and including a flat web portion 13a forming a web between the upper and lower surfaces of the aerofoil. As illustrated, this tube is formed from strip with a seam 21. The skin component 12a of thin light alloy sheet is wrapped round the main spar tube and makes contact with it, as shown at 22, along the whole of that part of the main spar tube surface, which conforms to the aerofoil section. The remainder of the skin component conforms to the trailing part of the aerofoil section so that the surface of the blade is formed by the skin component 12a throughout. The trailing edge is formed by an extrusion 23 in light alloy secured to the skin component 12a by rivets 24. The skin component is bonded by a gap-filling adhesive or adhesives, in the manner already described, to the main spar tube over the whole area of contact of the joint 22.

The construction of Figure 5 is similar to that shown in Figure 4 with the addition of a channel section auxiliary spar 25 of light alloy sheet, the flanges of which are bonded to the upper and lower surfaces of the skin component 12a with a gap-filling adhesive or adhesives. In this example, the main spar 11a is shown as being made in two parts, with a seam 21a near the centre of the web portion 13a and another at 21b at the leading edge.

The construction of Figure 6 is again similar to that of Figure 5, but has two channel section auxiliary spars 25a and 25b. In this instance the main spar 11a is shown as being of seamless tubing.

Figures 7 to 9 illustrate the root fitting of the blade and its attachment. For the purpose of illustration, a blade of the form shown in Figure 5 is selected. The root fitting, generally indicated at 27, is in the form of a cranked sleeve of high-strength material such as alloy steel and is made in two halves 27a, 27b which meet approximately on the span-chord plane of the blade and are flanged outwardly at 27c, the flanges being drilled at 28 to receive clamping bolts (not shown). The two halves of the sleeve are shaped to conform to the root end of the main spar tube 11a, 13a as far as the inner end of the latter. From this point the section of the two-part sleeve changes, terminating in a circular collar 29 in which is formed an internal shoulder 30 for connection to a blade-mounting stub or pitch-changing bearing assembly (not shown). At the point 31 at which the main spar tube 11a terminates, the root sleeve is cranked to bring the centre of the circular collar 29 onto the axis X—X which is the approximate locus of the centres of gravity of the blade sections and is the axis about which the blade rotates for the purpose of changing pitch.

The skin component of the blade terminates at the outer end of the root sleeve 27a and the inner portion of the blade is tapered in plan so that the trailing edge member 23 meets the web portion 13a of the main spar tube 11a at the outer end of the root sleeve, the auxiliary spar 25 being inclined inwards to meet the web portion 13a of the main spar somewhat outboard of this point. The structure is internally reinforced near the junction of the trailing edge member 23 with the main spar by a small transverse stiffener 26.

The inboard end of the main spar is bonded to the root sleeve 27 by means of a gap-filling adhesive or adhesives in the manner already described; or alternatively, a fairly thick layer of rubber may be interposed between the root sleeve and main spar without adhesive. In either case the two halves of the root sleeve are tightly clamped onto the main spar by means of the clamping bolts and mechanical keying against centrifugal loading is provided by the taper of the main spar and root fitting. The taper in thickness is not great enough to show in elevation in Figure 7, but the taper in plan will be seen in Figure 8.

The wall thickness of the root sleeve at the point 31 must be sufficiently great, having regard to the greater overall diameter of the root sleeve than that of the main spar tube in the chord-span plane and to the stiffening effect of the flanges 27c, to ensure that the flexural stiffness and strength of the root sleeve in the chord-span plane is at least as great as and preferably greater than that of the main spar tube immediately outboard of the root sleeve where it receives no support from the latter; and to maintain uniform flexural strength and stiffness over the whole of the unsupported part of the root sleeve inboard of the point 31, having regard to the decrease of diameter in the chord-span plane inboard from the point 31, the wall thickness of the root sleeve must be progressively increased from the point 31 to the collar 29 as indicated in Figure 8.

Figure 10 illustrates in plane view a complete blade, the construction of which is similar to that illustrated in Figure 4, and shows the taper in plan of the blade as a whole and of the main spar 11a.

Figures 10a, 10b show sections of the main spar tube at stations A—A and B—B, along the blade from which it will be seen that the wall thickness of the spar tube increases from root to tip, while the external dimensions of the tube in the span-chord plane and transversely thereof decrease from root to tip. It will also be seen that the taper in plan of the main spar tube is less than that of the whole blade so that the distance from the leading edge, expressed as a fraction of the chord, of the web portion 13a of the main spar tube, increases continuously from the root to the tip of the blade. The effect of this disposition of wall thickness and web position has already been discussed. If desired, the blade may be made with twist, i. e. wash-out or wash-in, but this is not illustrated.

In any of the forms of construction illustrated in the drawings, the interior of the trailing portion of the blade bounded by the upper and lower surfaces of the skin component 12 or 12a may be wholly or partly filled with a cellular material such as expanded rubber or a honeycomb structure of paper, metal foil or the like.

It is to be understood that the skin component 12 or 12a in any of the constructions illustrated may be of the composite construction previously described instead of being made of thin metal sheet as illustrated.

What we claim is:

1. For a sustaining rotor for aircraft, an aerofoil rotor blade comprising a primary constructional component, namely a tubular main spar of high-strength metal whose section is shaped to conform at least to the leading portion of the aerofoil section, said tube extending substantially from the root to the tip of the blade, the wall thickness of said spar tube increasing progressively from the root region to the tip region of the blade.

2. A construction according to claim 1, wherein said spar is defined in part by an upright web or wall, aft of the leading edge of the aerofoil, and further wherein the proportion of the total perimeter of the aerofoil section occupied by said main spar tube increases continuously from root to tip, so that the mean distance from the leading edge, expressed as a fraction of the blade chord, of said web part of said spar, increases continuously from the root region to the tip region.

3. A construction according to claim 2, wherein the rotor blade is of wider chord in the root region than in the tip region.

4. A construction according to claim 1, wherein the rotor blade is of wider chord in the root region than in the tip region.

5. A construction according to claim 1, in combination with a tubular root sleeve adapted for connection with a pitch change bearing and secured to the said main spar, the root sleeve being cranked, viewed in plan, so as to bring the locus of the centers of gravity of the blade sections into approximate alignment with the axis of pitch change.

6. The construction of claim 5, in which the root sleeve is split along the chord-span plane and is tightly clamped around the inboard end of the main spar component, being shaped to fit closely thereto, and the cranked portion of the root sleeve is inboard of the inboard end of the main spar component.

7. A construction according to claim 5, wherein the root sleeve and the mating portion of the main spar component are tapered outwardly so as to provide mechanical keying between these members to resist centrifugal loading.

8. The construction of claim 1, wherein the rotor blade comprises a second important constructional component in the form of a light metallic skin defining the portion of the aerofoil section aft of said main spar tube.

9. The construction of claim 8, wherein both of said components are tapered from the root region to the tip region, viewed in plan.

10. A construction according to claim 9, wherein the tapered construction of said component forms a blade which in plan is of narrower chord at the tip region than at the root region.

11. The construction of claim 8, wherein the tapering wall thickness of the first-mentioned component is at all sections thicker than the wall thickness of the second component.

References Cited in the file of this patent

UNITED STATES PATENTS

| Number | Name | Date |
|---|---|---|
| 1,685,881 | Nixon | Oct. 2, 1928 |
| 2,106,761 | Roberts | Feb. 1, 1938 |
| 2,152,861 | Bennett | Apr. 4, 1939 |
| 2,155,375 | Jablonsky | Apr. 18, 1939 |
| 2,183,158 | Bennett | Dec. 12, 1939 |
| 2,243,432 | Mautner | May 27, 1941 |
| 2,272,439 | Stanley | Feb. 10, 1942 |
| 2,303,707 | Pullin | Dec. 1, 1942 |
| 2,304,718 | Swart | Dec. 8, 1942 |
| 2,351,152 | Schick | June 13, 1944 |
| 2,370,136 | Berliner | Feb. 27, 1945 |
| 2,422,592 | Sigmund | June 17, 1947 |
| 2,444,333 | Castan | June 29, 1948 |
| 2,469,480 | Sikorsky | May 10, 1949 |
| 2,511,862 | Martin | June 20, 1950 |

FOREIGN PATENTS

| Number | Country | Date |
|---|---|---|
| 476,597 | Great Britain | Dec. 13, 1937 |
| 588,997 | Germany | Dec. 1, 1933 |